Patented July 5, 1927.

1,634,293

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

MANUFACTURE OF MOLDED ARTICLES FROM LATEX.

No Drawing. Application filed August 22, 1923. Serial No. 658,833.

This invention relates to the molding of articles, and more particularly to the molding of articles containing a percentage, preferably low, of rubber.

A principal object of the invention is the provision of a process for molding articles from a low rubber content material at comparatively low cost.

Another important object of the invention is the provision of a process for employing latex efficiently and economically in the production of tough, firm molded materials of low rubber content.

Other objects and advantages of the invention will be apparent as it is better understood from the following description of the process selected as a preferred embodiment of the invention to or on the material thereby produced.

In practicing our invention we contemplate the dry molding of a suitable mixture of latex with fillers through the coagulation of the mass in the presence of large volumes of water, permitting the resultant rubber or partially coagulated latex to attach itself to the particles of filler rather than separating out in lump condition. Preferably a mixture of wood flour, zinc oxide or other rubber filler together with the sulphur necessary for the vulcanization of the rubber is suspended in water. Along with the fillers we prefer to add a catalyst as thiocarbonalide if a hot molding is to be accomplished, this catalyst being omitted if the molded article is to be cold cured. Sufficient water is added to insure the mass being in suspension in water and to this a quantity of latex is introduced. The resultant mixture is constantly agitated while a suitable coagulant is added in amount to partially coagulate or agglomerate the colloidal particles. The amount of the coagulation is sufficient, and preferably only sufficient to break the suspension and cause the filler and the coagulated material to precipitate or settle out. If the proportions of the various ingredients have been properly chosen the settling out or precipitating of the material will not produce or form the solid mass characteristic of coagulated rubber but will produce a granulated or flaky condition. The water is then drained off and the material dried at a low temperature. Thereafter it may be hot molded by putting it in a mold and pressing and heating the same to compress the articles into a firm mass and vulcanize the rubber.

An example of a mixture is as follows: wood flour, 15 gms.; zinc oxide or clay, 15 gms.; rubber latex, 36% rubber, 10 c. c.; sulphur, 5% of rubber used; catalyst (mild and incapable of so-called cold cure); water 700 c. c. This mixture gives about a 10% rubber content in the material and it has been discovered that with such a low percentage of rubber firm, tough materials will be molded. Manifestly the proportions may be varied and more rubber used in some instances as desired.

Cold molding may be accomplished by omitting the catalyst from the above formula and moistening the proper material with a small amount of organic solvent containing a catalyst in solution. For cold curing a condensation product of carbon bisulphide, such as tetra methyl, thiuram disulphide, etc., may be employed and the cold curing proceeded with in the ordinary manner. The material in either event, after being dried, has the form of a dry, flaky powder readily handled and easily molded.

We claim:

1. The process of molding articles, comprising, forming a suspension of a filler, adding latex, partially coagulating the latex, removing the liquid content, drying and pressing.

2. The process of molding articles, comprising, forming a suspension of a filling material and sulphur for vulcanization, adding latex, partially coagulating the latex, removing the liquid, pressing, and vulcanizing.

3. The process of molding articles, comprising, forming a suspension of a filling material and sulphur for vulcanization, adding latex, partially coagulating the latex, removing the liquid, and vulcanizing.

4. The process of molding articles, comprising, forming a suspension of a filling material and providing sufficient water to hold the mass in suspension, adding latex, partially coagulating the latex, removing the liquid, and pressing.

5. The process of molding articles, comprising, forming a suspension of a filling material, adding latex, agitating the mass and during said agitation partially coagulating the latex, drying and pressing.

6. The process of molding articles, comprising, forming a suspension of a filling material, adding latex, partially coagulating the latex, removing the liquid and drying to form a flaky powder, and pressing said powder to molded form.

7. The process of molding articles, comprising, forming a suspension including a filling material, adding latex, partially coagulating the latex to provide a precipitate, drying said precipitate to form a dry flaky powder, and pressing.

8. The process of molding articles, comprising, forming an emulsion of a filling material and sulphur for vulcanization, adding latex, partially coagulating the latex, removing the liquid, drying to provide a flaky powder containing the filler, rubber and sulphur for vulcanization, pressing and vulcanizing.

CHAUNCEY C. LOOMIS.
HORACE E. STUMP.